(12) United States Patent
Butt et al.

(10) Patent No.: US 7,543,439 B2
(45) Date of Patent: Jun. 9, 2009

(54) GENERATOR ASSEMBLY

(75) Inventors: David C Butt, Derby (GB); Alan R Maguire, Derby (GB)

(73) Assignee: Rolls-Royce plc, London (GB)

( * ) Notice: Subject to any disclaimer, the term of this patent is extended or adjusted under 35 U.S.C. 154(b) by 431 days.

(21) Appl. No.: 11/167,383

(22) Filed: Jun. 28, 2005

(65) Prior Publication Data
US 2007/0017226 A1    Jan. 25, 2007

(51) Int. Cl.
*F02C 7/32* (2006.01)
(52) U.S. Cl. .................. 60/39.183; 60/785; 60/802; 290/4 C
(58) Field of Classification Search .......... 60/39.183, 60/785, 802; 290/4 C, 4 D
See application file for complete search history.

(56) References Cited

U.S. PATENT DOCUMENTS

| | | | |
|---|---|---|---|
| 2,608,054 A | 8/1952 | Price | |
| 3,188,479 A | 6/1965 | Wood | |
| 3,514,945 A | 6/1970 | Austin | |
| 4,514,976 A * | 5/1985 | Christoff | 60/785 |
| 4,779,644 A * | 10/1988 | Benson | 60/785 |
| 4,979,362 A | 12/1990 | Vershure | |
| 5,114,103 A | 5/1992 | Coffinberry | |
| 5,184,458 A | 2/1993 | Lampe | |
| 5,201,798 A * | 4/1993 | Hogan | 60/791 |
| 2006/0260323 A1* | 11/2006 | Moulebhar | 60/793 |

FOREIGN PATENT DOCUMENTS

| EP | 0 200 178 A | 4/1986 |
|---|---|---|
| GB | 0 987 878 | 3/1965 |

* cited by examiner

*Primary Examiner*—Louis J Casaregola
(74) *Attorney, Agent, or Firm*—W. Warren Taltavull; Manelli Denison & Selter PLLC

(57) ABSTRACT

A generator assembly for a gas turbine engine. The assembly includes an electrical generator connected via a first sprag clutch to an accessory gearbox driven by the engine. The generator is also connected by a second sprag clutch to an air turbine connected to engine bleed valves which are selectively open when the engine speed falls below a predetermined level. The clutches are arranged such that the generator is driven at any time by the fastest rotating of the gearbox and turbine.

18 Claims, 2 Drawing Sheets

GENERATOR ASSEMBLY

FIELD OF INVENTION

This invention concerns a generator assembly for a gas turbine engine, a gas turbine engine, an aircraft, a method of generating electricity from a gas turbine engine, and a method of providing cabin pressurisation in an aircraft.

BACKGROUND OF THE INVENTION

Currently electrical generators on large civil aircraft are driven by the accessory (external) gearbox. Also on such aircraft cabin pressurisation is generally provided by air bled from the engines. For future aircraft, and particularly those having composite wings, it is not desirable to have hot bleed pipes passing through the wings. Especially with composite wings there would be a potential hazard in the event of a pipe failure.

As an alternative to the above outlined arrangement, cabin pressurisation can be achieved by having compressors onboard the aircraft and powering them by electricity generated by the engine. This would however increase the size of the generators on the engine. Such large generators could still be powered by the engine except that at descent conditions the electrical load will tend to slow the shaft and thus stall the compressor. The descent idle speed of the engine could be increased to prevent such a stall, but this also increases the engine thrust during descent which is undesirable.

Airports generally have the capability to start aircraft engines pneumatically. Usually a ground support cart is provided which has a large compressor or a compressed air tank on board. Not all airports though have the capability to start aircraft engines electrically, and particularly in view of the significant electrical power which may be required for this. Not all aircraft engines can though be started pneumatically, and therefore the use of such aircraft has to be limited to locations where electrical starting is possible.

SUMMARY OF THE INVENTION

According to the present invention there is provided a generator assembly for a gas turbine engine, the assembly including an electrical generator, the assembly also including a first clutch arrangement which selectively connects the electrical generator to an accessory gearbox driven by the engine, an air turbine, a second clutch arrangement which selectively connects the electrical generator and the air turbine, the air turbine being connected to one or more engine bleed valves so as to be driven by air directed from the valve or valves, the first and second clutch arrangements being configured such that in use the electrical generator is connected to whichever of the accessory gearbox or air turbine is rotated fastest, and the electrical generator is disconnected from the other of the accessory gearbox and air turbine.

The invention also provides a gas turbine engine assembly, the assembly including an electrical generator, an accessory gearbox, and one or more engine bleed valves, the engine also including a first clutch arrangement which selectively connects the electrical generator to the accessory gearbox, an air turbine connected to the engine bleed valve or valves so as to be driven by air directed from the valve or valves, a second clutch arrangement which selectively connects the electrical generator and the air turbine, the first and second clutch arrangements being configured such that in use the electrical generator is connected to whichever of the accessory gearbox or air turbine is rotated fastest, and the electrical generator is disconnected from the other of the accessory gearbox and air turbine.

The engine bleed valve or valves may be selectively openable, and may be arranged to only be open when the engine speed is below a predetermined level.

A manifold may be provided which connects a plurality of engine bleed valves, to collect air from the valves for delivery to the air turbine.

The first and/or second clutch arrangements may be in the form of a sprag clutch.

Alternatively, the first and or second clutch arrangements could comprise any of dry or wet friction plates, hydraulic torque converters, ratchet and pawl arrangements.

An inlet connection may be provided to permit connection of the assembly to an external source of air to drive the air turbine.

A non return valve may be provided in the inlet connection to prevent air passing out thereof. A non return valve may be provided between the inlet connection and the engine bleed valve or valves to prevent air travelling from the connection to the valve or valves.

Means may be provided for actively controlling the first clutch arrangement, and the clutch arrangement may be controllable by an aircraft engine electronic controller.

The invention yet further provides an aircraft including a plurality of gas turbine engines according to any of the preceding eight paragraphs.

The aircraft may also include one or more compressors for providing cabin pressurisation, the or each compressor being connected to one or more of the electrical generators of the engines.

The invention still further provides a method of generating electricity from a gas turbine engine, the method including providing an air turbine connected to one or more bleed valves so as to be driven by air directed from the valve or valves, and in use selectively driving an electrical generator from the fastest rotating of an accessory gearbox driven by the engine, and the air turbine.

The bleed valve or valves are preferably only open when the engine speed is below a predetermined level.

The invention further provides a method of providing cabin pressurisation in an aircraft, the method including using electricity generated by a method according to either of the above paragraphs, to drive one or more compressors.

The invention also provides a method of starting a gas turbine engine assembly according to the above paragraphs, the method comprising supplying air through the inlet connection to the air turbine which rotates the electrical generator via the second clutch arrangement, which rotates the accessory gearbox via the first clutch arrangement.

BRIEF DESCRIPTION OF THE DRAWINGS

Embodiments of the present invention will now be described by way of example only, and with reference to the accompanying drawings in which:—

DETAILED DESCRIPTION OF THE INVENTION

Figure 1:
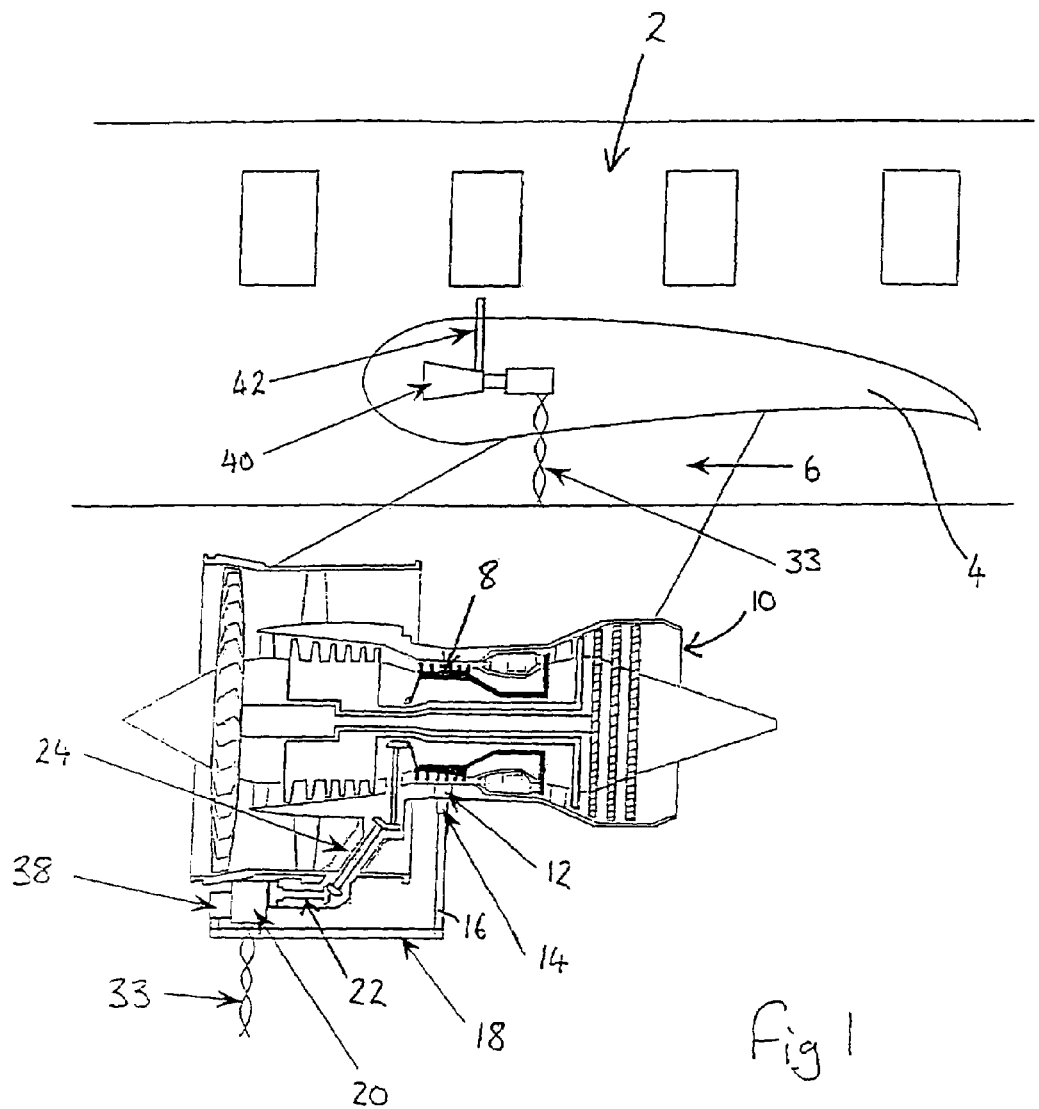
FIG. 1 is a diagrammatic side view of part of an aircraft with a gas turbine engine incorporating a first generator assembly according to the invention.
Figure 2:
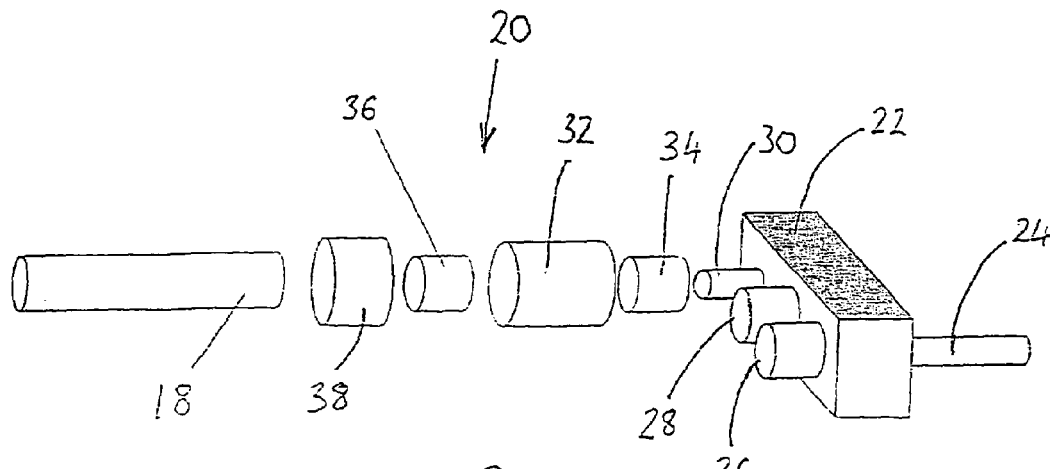
FIG. 2 is a diagrammatic exploded side view of part of the generator assembly of FIG. 1.
Figure 3:
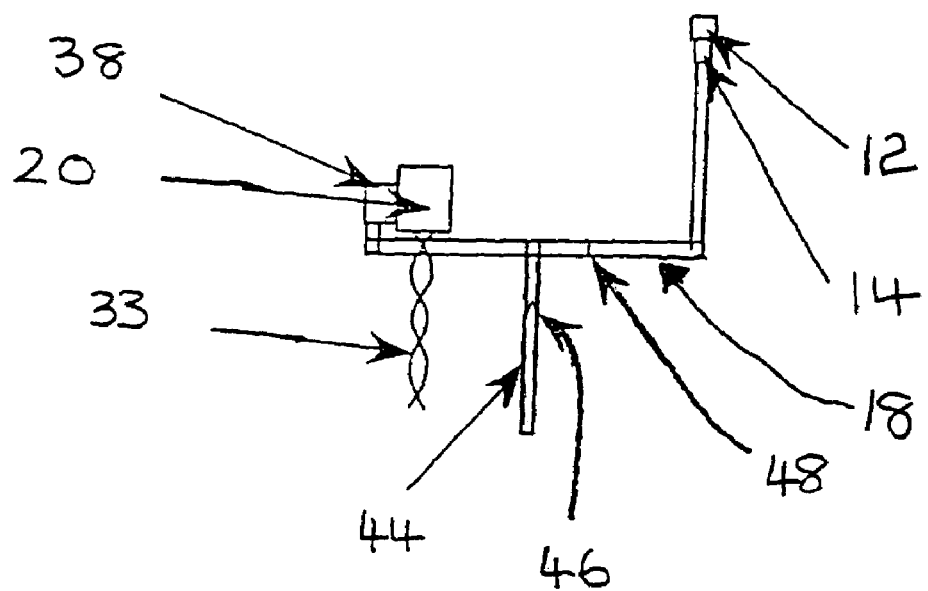
FIG. 3 is a diagrammatic side view of part of a second generator assembly according to the invention.

FIGS. 1 and 2 of the drawings show part of an aircraft 2 with a wing 4 and a pylon 6 which mounts a gas turbine engine 10. A plurality of selectively openable engine bleed valves 12 are provided for receiving air from the compressor 8 of the engine 10. The valves 12 connect to a manifold 14 which directs air from the valves 12 through an air pipe 16 leading to an air supply pipe 18.

The air supply pipe 18 connects to an electrical generator unit 20 which connects to an accessory gearbox 22. The gearbox 22 is driven by a shaft 24 which connects to the engine 10. The gearbox 22 includes connections 26, 28, 30 respectively to the starter motor, number one hydraulic pump and to the electrical generator unit 20.

The unit 20 includes an electrical generator 32 connected to the connection 30 by a first sprag clutch 34. The generator 32 has an electrical connection 33. The unit 20 also comprises a second sprag clutch 36 on an opposite end of the generator 32 from the clutch 34. The clutch 36 connects the generator 32 to an air turbine 38. The supply pipe 18 is connected to the air turbine 38 such that air from the bleed valves 12 turns the air turbine 38.

The first and second sprag clutches 34, 36 are arranged such that the electricity generator 32 is connected to the one of the air turbine 38 and gearbox 22 which is rotating fastest, and is disconnected from the other of these two.

The generator 32 is connected by the connection 33 to one or more electrical compressors 40 to provide cabin pressurisation, thereby removing the requirement for hot bleed air pipes, passing for instance through the aircraft's wing 4. A respective air delivery pipe 42 extends into the aircraft 2 from the compressor or compressors 40.

In use of the engine 10, the accessory drive shaft 24 will be turned by rotation of the engine 10 causing the gearbox 22 to rotate. In general usage the bleed valves 12 will be closed. When the valves 12 are opened, air from the engine will be directed through the manifold 14, and pipes 16, 18, to rotate the air turbine 38.

The bleed valves 12 are used to reduce pressure across a compressor to prevent an instantaneous breakdown in airflow therethrough, and will generally be pressure sensitive. For example, reverse flow would otherwise occur when engine power is reduced relatively quickly and the hp turbine (and compressor) slows first followed by the ip turbine (and compressor) as they are in flow series. For a moment the flow through the ip compressor is stopped by the reduced flow through the hp compressor and thus there is insufficient pressure ratio across the ip compressor to continue working; surge or reverse flow may then occur. However, surge is prevented when the pressure sensitive bleed valves 12 open to release pressure downstream and maintain a pressure ratio across the ip compressor. The bleed valves 12 may also open when the engine accelerates quickly from low powers (not high power though) and the hp compressor effectively over works.

When the air turbine 38 is not rotating or is rotating more slowly than the gearbox 22, the generator 32 will be driven through the first sprag clutch 34 and the connection 30, by the gearbox 22 and the second sprag clutch 36 will disconnect the turbine 38 from the generator 32. When however the air turbine 38 rotates more quickly than the gearbox 22, the second sprag clutch 36 will connect the generator 32 to the turbine 38 to be driven thereby, and the first sprag clutch 34 will disconnect the gearbox 22 from the generator 32.

In practice, this means that during take off and normal flight conditions when the engine 10 is at either medium or high throttle settings, the generator 32 will be driven by the gearbox 22 in a conventional manner. During this time the valves 12 will be closed and hence the turbine 38 will not be turning. During descent, when the engine is throttled back, the engine speed and hence speed of the gearbox 22 will reduce. The reduced engine speed will cause the bleed valves 12 to open thereby causing the turbine 38 to rotate. The rotation speed of the turbine 38 will increase, and when this exceeds that of the gearbox 22, the turbine 38 will take over driving the generator 32. If at any time the engine 10 is reaccelerated, this will cause the bleed valves 12 to close and the gearbox 32 speed to increase. The generator 32 will again then be driven by the gearbox 22.

There is thus described an arrangement which removes the need for hot bleed air pipes passing through a significant part of an aircraft. This arrangement permits electrical compressors to be driven irrespective of the engine speed, and without the requirement to increase the descent idle speed of the engine. The arrangement is of a relatively simple configuration and can thus be inexpensively and robustly manufactured. Using sprag clutches means that no other controllers, actuators or the like are required.

FIG. 2 shows part of a second generator assembly, which in most respects is similar to the first assembly described above and the same reference numerals have been used for corresponding components. In this second assembly an inlet connection in the form of a pipe 44 is provided which permits connection to a supply of compressed air which could for instance be provided on a ground support cart from a compressor or compressed air tank. A non return valve 46 is provided in the pipe 44 to prevent air passing thereoutof. The pipe 44 connects into the air supply pipe 18. A further non return valve 48 is provided in the pipe 18 between the pipe 44 and the bleed valve 12, to prevent air from the pipe 44 reaching the valve 12.

This second assembly permits starting of a gas turbine engine pneumatically where otherwise this may not be possible. Before a normal electric start no air will be supplied through the pipe 44 and the second assembly would operate in exactly the same way as the first assembly. For a pneumatic start, compressed air will be supplied through the pipe 44 from a ground supply. This would turn the air turbine 38 which will turn the generator 32 via the clutch 36 which will turn the gearbox 22 via the clutch 34.

At least the clutch 34 would require to be actively controlled, and the clutches 34, 36 would probably be other than sprag clutches. The clutch 34 would be controlled by the aircraft engine electronic controller. The clutch 34 would need to be engaged for electrical start of an engine, take-off and cruise, swapping to the clutch 36 for descent. For a pneumatic start both clutches 34 and 36 would need to be engaged, with the clutch 36 disengaging when the engine has started.

There is thus described an arrangement which provides the above outlined advantages and also permits the equivalent of an electrical starting but using pneumatic power, which alleviates the problem that an appropriate electrical supply may not be available.

It is to be appreciated however that various other modifications may be made without departing from the scope of the invention. For example, different clutching devices could be used. These could be for example friction plates (dry or wet), hydraulic torque converters, or ratchet and pawl arrangements.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A generator assembly for a gas turbine engine, the assembly including an electrical generator, wherein the assembly also includes a first clutch arrangement which selectively connects the electrical generator to an accessory gearbox driven by the engine, an air turbine, a second clutch arrangement which selectively connects the electrical generator and the air turbine, the air turbine being connected to one or more engine bleed valves so as to be driven by air directed from the valve or valves, the first and second clutch arrangements being configured such that in use the electrical generator is connected to whichever of the accessory gearbox or air turbine is rotated fastest, and the electrical generator is disconnected from the other of the accessory gearbox and air turbine, wherein the one or more engine bleed valve is constructed and arranged to only be open when the engine speed is below a predetermined level.

2. A gas turbine engine assembly, the assembly including an electrical generator, an accessory gearbox, and one or more engine bleed valves, wherein the engine also includes a first clutch arrangement which selectively connects the electrical generator to the accessory gearbox, an air turbine connected to the engine bleed valve or valves so as to be driven by air directed from the valve or valves, a second clutch arrangement which selectively connects the electrical generator and the air turbine, the first and second clutch arrangements being configured such that in use the electrical generator is connected to whichever of the accessory gearbox or air turbine is rotated fastest, and the electrical generator is disconnected from the other of the accessory gearbox and air turbine, wherein the one or more engine bleed valves is constructed and arranged to only be open when the engine speed is below a predetermined level.

3. An assembly according to claim 1, wherein a manifold is provided which connects a plurality of engine bleed valves, to collect air from the valves for delivery to the air turbine.

4. An assembly according to claim 1, wherein the first and/or second clutch arrangements are in the form of a sprag clutch.

5. An assembly according to claim 1, wherein the first and or second clutch arrangements comprise any of dry or wet friction plates, hydraulic torque converters, ratchet and pawl arrangements.

6. An assembly according to claim 1 wherein an inlet connection is provided to permit connection of the assembly to an external source of air to drive the air turbine.

7. An assembly according to claim 6, wherein a non return valve is provided in the inlet connection to prevent air passing out thereof.

8. An assembly according to claim 6 wherein a non return valve is provided between the inlet connection and the engine bleed valve or valves to prevent air passing from the connection to the valve or valves.

9. An assembly according to claim 6 further comprising an aircraft engine electronic controller for actively controlling the first clutch arrangement to enable the generator to drive the gear box.

10. An aircraft, wherein the aircraft includes a plurality of gas turbine engines according to claim 2.

11. An aircraft according to claim 10, wherein the aircraft also includes one or more electrically powered compressors for providing cabin pressurisation, the or each electrically powered compressor being electrically connected to one or more of the electrical generators of the engines.

12. An assembly according to claim 2, wherein a manifold is provided which connects a plurality of engine bleed valves, to collect air from the valves for delivery to the air turbine.

13. An assembly according to claim 2, wherein an inlet connection is provided to permit connection of the assembly to an external source of air to drive the air turbine.

14. An assembly according to claim 13, wherein a non return valve is provided in the inlet connection to prevent air passing out thereof.

15. An assembly according to claim 13, wherein a non return valve is provided between the inlet connection and the engine bleed valve or valves to prevent air passing from the connection to the valve or valves.

16. An assembly according to claim 13, further comprising an aircraft engine electronic controller for actively controlling the first clutch arrangement to enable the generator to drive the gear box.

17. An aircraft, wherein the aircraft includes a plurality of gas turbine engines according to claim 1.

18. An aircraft according to claim 17, wherein the aircraft also includes one or more electrically powered compressors for providing cabin pressurisation, the or each electrically powered compressor being electrically connected to one or more of the electrical generators of the engines.

* * * * *